(12) United States Patent
Heinonen et al.

(10) Patent No.: US 9,791,859 B1
(45) Date of Patent: Oct. 17, 2017

(54) METHOD AND SYSTEM FOR CONTROLLING REMOTELY PILOTED AIRCRAFT

(71) Applicant: Sharper Shape Oy, Espoo (FI)

(72) Inventors: Tero Heinonen, Jarvenpaa (FI); Atte Korhonen, Espoo (FI)

(73) Assignee: Sharper Shape Oy, Espoo (FI)

( * ) Notice: Subject to any disclaimer, the term of this patent is extended or adjusted under 35 U.S.C. 154(b) by 0 days.

(21) Appl. No.: 15/136,276

(22) Filed: Apr. 22, 2016

(51) Int. Cl.
*G05D 1/00* (2006.01)

(52) U.S. Cl.
CPC ......... *G05D 1/0022* (2013.01); *G05D 1/0088* (2013.01); *B64C 2201/141* (2013.01); *B64C 2201/146* (2013.01)

(58) Field of Classification Search
CPC ................ G05D 1/0022; G05D 1/0088; B64C 2201/141; B64C 2201/146; B64C 39/024
See application file for complete search history.

(56) References Cited

U.S. PATENT DOCUMENTS

| | | | |
|---|---|---|---|
| 8,838,289 B2* | 9/2014 | Margolin | G05D 1/0044 244/158.1 |
| 9,524,648 B1* | 12/2016 | Gopalakrishnan | G08G 5/0082 |
| 2015/0117466 A1* | 4/2015 | Summer | B25J 9/1689 370/465 |
| 2015/0153740 A1* | 6/2015 | Ben-Shachar | G05D 1/0676 701/16 |
| 2015/0338855 A1* | 11/2015 | Stark | B64C 39/024 701/3 |

* cited by examiner

*Primary Examiner* — Michael J Zanelli
(74) *Attorney, Agent, or Firm* — Ziegler IP Law Group, LLC

(57) ABSTRACT

Disclosed are a method and a system for modifying flight parameters of a remotely piloted aircraft. The remotely piloted aircraft includes a clock, at least one radio receiver and at least one radio transmitter for communicating with at least one radio transmitter of a ground station, via at least one radio communication network. The method includes analyzing a communication between the remotely piloted aircraft and the ground station, such as calculating the latency of the communication. The method also includes modifying at least one flight parameter based on the calculated latency and pre-loaded instructions.

20 Claims, 6 Drawing Sheets

500

RECEIVE A TIMESTAMPED COMMUNICATION INCLUDING AT LEAST ONE FLIGHT CONTROL COMMAND FROM A GROUND STATION
502

↓

RECEIVE A REQUEST FOR PRIORITIZING THE COMMUNICATION FROM THE GROUND STATION
504

↓

COMMUNICATE WITH THE GROUND STATION FOR ANALYZING THE COMMUNICATION
506

↓

ANALYZE THE RECEIVED COMMUNICATION TO CALCULATE A LATENCY OF THE FLIGHT CONTROL COMMAND BASED ON A TIMESTAMP OF THE RECEIVED COMMUNICATION
508

↓

ANALYZE QUALITY OF THE RECEIVED COMMUNICATION
510

↓

MODIFY AT LEAST ONE FLIGHT PARAMETER BASED ON THE ANALYSIS OF THE RECEIVED COMMUNICATION AND PRE-LOADED INSTRUCTIONS
512

↓

SEND A REPLY COMMUNICATION TO THE GROUND STATION
514

FIG. 5

METHOD AND SYSTEM FOR CONTROLLING REMOTELY PILOTED AIRCRAFT

TECHNICAL FIELD

The present disclosure generally relates to remotely piloted aircraft; and more specifically, to methods and systems for controlling flight parameters of a remotely piloted aircraft (RPA), such as a drone.

BACKGROUND

In recent past, due to rapid advancements in aviation technology, there has been a surge in the development, improvement and use of remotely piloted aircraft. The remotely piloted aircraft are now increasingly used for a variety of purposes like surveillance, disaster relief operations, aerial imaging, military combat, and so forth. The critical element for the success of any remotely piloted aircraft, such as a drone, is the ability to efficiently control the operation of the remotely piloted aircraft.

Presently, there exist many techniques to regulate the operation of the remotely piloted aircraft as discussed herewith. An existing technique uses a pre-programmed set of instructions or commands integrated into the remotely piloted aircraft to control functionality of the remotely piloted aircraft. However, this method is not reliable in case of anomalous conditions for which specific instructions are not available.

In another technique, replicated flight control panels similar to those in the remotely piloted aircraft (RPA) are set up at a control station where an operator can keep a check and control various flight parameters of the RPA. The operator actions for control are transmitted wirelessly and replicated at the flight control panel in the aircraft. This approach lacks measures for interaction in case the communication link is weak or severed. Another existing method for communicating instructions to the RPA uses satellite communication. However, in this method noise or interference gets generated due to atmospheric disturbances and disrupts the interchange of instructions/data between the operator and the RPA.

Therefore, in light of the above-stated discussion, there exists a need for improved techniques for controlling remotely piloted aircraft from a ground station.

SUMMARY

The present disclosure seeks to provide a method for modifying flight parameters of a remotely piloted aircraft.

The present disclosure also seeks to provide a system for modifying flight parameters of a remotely piloted aircraft.

In one aspect, an embodiment of the present disclosure provides a method for modifying flight parameters of a remotely piloted aircraft, wherein the remotely piloted aircraft comprises:
  a clock;
  at least one radio receiver and at least one radio transmitter for communicating with at least one radio transmitter of a ground station, via at least one radio communication network, which ground station is equipped with a clock; and
  a controller for controlling movements of the remotely piloted aircraft using flight parameters;
the method comprising:
  the remotely piloted aircraft analysing a communication between the remotely piloted aircraft and the ground station; including calculating the latency of the communication; and
  the remotely piloted aircraft modifying at least one flight parameter based on the calculated latency and pre-loaded instructions.

In another aspect, an embodiment of the present disclosure provides a system for modifying flight parameters of a remotely piloted aircraft, comprising:
  a remotely piloted aircraft comprising:
    a clock;
    at least one radio receiver and at least one radio transmitter;
    a controller for controlling movements of the remotely piloted aircraft using flight parameters; and
    a processor communicably coupled to the clock, the at least one radio receiver, the at least one radio transmitter and the controller;
  a ground station comprising:
    a clock; and
    at least one radio receiver and at least one radio transmitter; and
  at least one radio communication network,
wherein
  the processor is configured to analyse a communication, including calculating the latency of the communication, and to instruct the controller to modify at least one flight parameter based on the calculated latency and pre-loaded instructions.

Embodiments of the present disclosure substantially eliminate or at least partially address the aforementioned problems in the prior art, and enables control of an RPA, from a ground station with improved communication reliability.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims. Furthermore, the various embodiments and variants are applicable to both the method and system according to the present disclosure.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIG. 5 is a flowchart illustrating a method for modifying a number of flight parameters of a remotely piloted aircraft, in accordance with an embodiment of the present disclosure.

Figure 1:
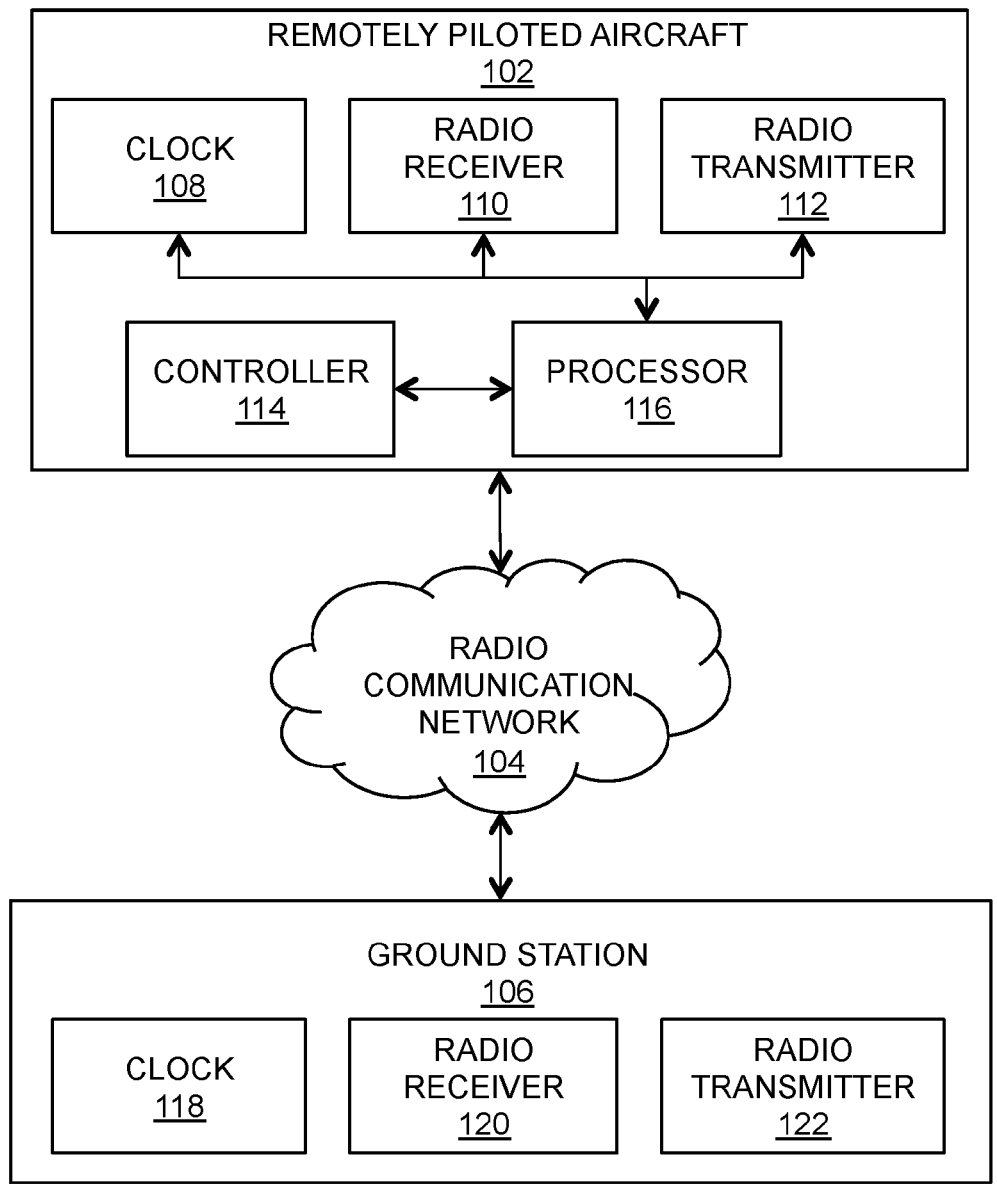
FIG. 1 is a schematic illustration of an environment where various embodiments of the present disclosure can function.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method for modifying flight parameters of a remotely piloted aircraft, wherein the remotely piloted aircraft includes:
  a clock;
  at least one radio receiver and at least one radio transmitter for communicating with at least one radio transmitter of a ground station, via at least one radio communication network, which ground station is equipped with a clock; and
  a controller for controlling movements of the remotely piloted aircraft using flight parameters;
the method comprising:
  the remotely piloted aircraft analysing a communication between the remotely piloted aircraft and the ground station, including calculating the latency of the communication; and
  the remotely piloted aircraft modifying at least one flight parameter based on the calculated latency and pre-loaded instructions.

In another aspect, an embodiment of the present disclosure provides a system for modifying flight parameters of a remotely piloted aircraft, comprising:
  a remotely piloted aircraft comprising:
  a clock;
  at least one radio receiver and at least one radio transmitter;
  a controller for controlling movements of the remotely piloted aircraft using flight parameters; and
  a processor communicably coupled to the clock, the at least one radio receiver, at least one radio transmitter and the controller;
a ground station comprising:
  a clock; and
  at least one radio receiver and at least one radio transmitter; and
at least one radio communication network,
wherein
the processor is configured to analyse a communication, including calculating the latency of the communication, and to instruct the controller to modify at least one flight parameter based on the calculated latency and pre-loaded instructions.

In an embodiment, the remotely piloted aircraft is a drone. In an embodiment, the remotely piloted aircraft is an unmanned aerial vehicle (UAV). In another embodiment, the remotely piloted aircraft is an unmanned aircraft system (UAS). For example, the remotely piloted aircraft is an aircraft without a human pilot aboard, where the aircraft is piloted remotely by an operator, for example a human or machine. For example, remotely piloted aircraft is an aircraft without a human pilot aboard, and the remotely piloted aircraft is configured to fly automatically or autonomously. Specifically, the remotely piloted aircraft may fly without any human control and/or may fly according to pre-programmed instructions and/or minimal or no human control/intervention.

In some embodiments, the remotely piloted aircraft is an unmanned aircraft configured for being controlled remotely from the ground station. Alternatively, the remotely piloted aircraft is a remotely piloted aircraft configured to fly semi-autonomously. Alternatively, the remotely piloted aircraft is a remotely piloted aircraft configured to fly fully automatically/autonomously where the remote operator, for example a human or machine, is able to override the automatic/autonomous control of the aircraft. For example, the remotely piloted aircraft may fly with some control by a human/operator or machine located remotely or located on ground. In such instance, the remotely piloted aircraft is configured to connect and/or communicate with at least one ground station via a communication network such as, a radio communication network. Further, the remotely piloted aircraft is configured to communicate with the at least one ground station via more than one communication networks or radio communication networks. In case one network of the multiple networks fails then the remotely piloted aircraft and the ground station may communicate via other networks of the multiple networks. This may assure communication reliability all the time between the ground station and the remotely piloted aircraft. Also, the remotely piloted aircraft may connect and/or communicate with more than one ground station.

In an embodiment, the communication comprises a timestamp and the latency is calculated based on the timestamp. Thus at least part of the communications between the remotely piloted aircraft include a timestamp. In such a case, the remotely piloted aircraft is configured to receive communication(s) including a timestamp and/or one or more flight control commands from the ground station via the communication network(s). Further, the remotely piloted aircraft may be configured to send measurement data, location data, operational parameter/status of the remotely piloted aircraft), and so forth, to the ground station.

According to an embodiment, the communication originates from the ground station. According to another embodiment, the communication originating from the ground station comprises at least one flight control command. The communication may naturally comprise also more than one flight control commands. The communication may also originate from the remotely piloted aircraft, depending on the embodiment.

In an embodiment, the one or more flight parameters of the remotely piloted aircraft are controlled based on the received one or more flight control commands from the ground station(s). Moreover, the remotely piloted aircraft may include means for measuring radio communication quality. For example, the remotely piloted aircraft may measure a quality of service (QoS) of a communication network for the received communication between the remotely piloted aircraft and the ground station. In such a case, the method further comprises analysing the quality of the received communication and modifying at least one flight parameter based on the analysed quality of received communication. According to an embodiment, the analysis of quality of the received communication further comprises communicating with the ground station and the latency of the flight control command further comprises communication time between the remotely piloted aircraft and the ground station.

In an embodiment, the means for measuring radio communication quality include at least one device including software, hardware, or combination of these and may be configured to measure various key performance index (KPI) parameters of the communication. For example, measurable parameters of the communication may include, such as, but not limiting to, bit rate, error rate, jitter, availability, transmission delay, throughput, and so forth.

In an embodiment, the at least one flight control command is selected from a group comprising flight direction and flight speed. Some examples of the flight control command thus include, such as, but nor limiting to, commands for modifying flight direction, flight speed, flight altitude, flight waypoints, changing the flight controller mode and so forth.

In an embodiment, the remotely piloted aircraft includes an autopilot module configured to manage flight parameters of the remotely piloted aircraft based on the commands received from the ground station.

The remotely piloted aircraft is configured to analyse a communication between the remotely piloted aircraft and the ground station, including calculating the latency of the communication. In an embodiment, the latency is calculated based on the timestamp. For example, the remotely piloted aircraft is configured to analyse the received communication for calculating communication latency. The remotely piloted aircraft is configured to modify at least one flight parameter based on the calculated latency and pre-loaded instructions based on the received communication including at least one command and may modify at least one flight parameter of the remotely piloted aircraft. Examples of the pre-loaded instructions may include, such as, but are not limited to, a threshold value of the latency and allowed flight parameters.

In one embodiment, the allowed flight parameters may include, such as, but are not limited to, regulatory rules, spatial coordinates, environmental conditions and operational parameters of the remotely piloted aircraft.

In an embodiment, the latency is the delay for a communication to be sent from the ground station via a communication network to the remotely piloted aircraft. The communication is then analysed and if necessary, executed by the remotely piloted aircraft. The latency may also be defined as including the time necessary for the remotely piloted aircraft to analyse the communication. The communication may be for example a command sent by the ground station, but it may also be a simple communication intended to check the quality of the transmission, i.e. without any specific command.

Further, the remotely piloted aircraft may include means for measuring the latency. The means for measuring the latency may include software, hardware, firmware, or combination of these. The means for measuring the latency may rely on having substantially accurate clocks in both i.e., the ground station and the remotely piloted aircraft, or they may rely on having a clock in the remotely piloted aircraft alone. In the latter case, the communication originates from the remotely piloted aircraft and the latency is the time required for the communication to make a round, i.e. from remotely piloted aircraft to ground station to remotely piloted aircraft. According to an embodiment, the ground station is also equipped with a clock and the method comprises synchronising the clock of the remotely piloted aircraft with the clock of the ground station. In a further embodiment, the synchronising the clocks is carried out during a flight start procedure. Alternatively, the clocks of the ground station and the remotely piloted aircraft may be synchronised based on a GPS signal clock received from a same satellite, i.e. the clock of the ground station and the clock of the remotely piloted aircraft may be satellite signal clocks. Alternatively, the clocks of the ground station and the remotely piloted aircraft may be synchronised based on a Network Time Protocol as specified in IETF standards RFC 956, RFC 958, RFC 1305.

In an embodiment, the command sent by the ground station is equipped with a timestamp in the ground station. In an embodiment, after receiving the timestamped command and being ready to execute the command, the remotely piloted aircraft may check the time from its own clock and calculate the difference or latency to the timestamp. The latency of the flight control command may include communication time between the remotely piloted aircraft and the ground station. Further, the latency of the flight control command may comprise transmission time of the communication from the ground station to the remotely piloted aircraft and analysis time of the communication by the remotely piloted aircraft.

In an embodiment, the latency of the communication includes a transmission time of the communication from the remotely piloted aircraft to the ground station, a processing time of the communication by the ground station, a transmission time of a reply communication from the ground station to the remotely piloted aircraft, and an analysis time of the reply communication by the remotely piloted aircraft.

In another embodiment, the latency may thus be calculated as an actual round trip time, e.g. sending a communication (or heartbeat message) from the remotely piloted aircraft to the ground station and waiting for the ground station to acknowledge, and calculate the time difference between the acknowledgement from the ground station and the time when the message was sent from the remotely piloted aircraft and making decision to change flight parameters. For example, there are multiple ways of defining a messaging protocol for exchanging commands or messages between the remotely piloted aircraft and the ground station. The essence is that the other party (for example, the ground station) is configured to reply to the message immediately, and the originating party (i.e. the remotely piloted aircraft) can identify the reply, i.e. timestamping the actual message is not mandatory but identifier of the sent message and identifier of the received message need to be "coupled together" in the remotely piloted aircraft.

In an alternative embodiment, the latency is calculated as an actual round trip time, e.g. sending a communication (or heartbeat message) from the ground station to the remotely piloted aircraft and waiting for the remotely piloted aircraft to acknowledge, and the ground station can calculate a time difference between the acknowledgement and the time when the message was sent from the ground station. In such instance, the ground station has the latency information and the ground station further needs to communicate the modification related to flight parameters to the remotely piloted aircraft.

In an embodiment, the latency measuring is "unidirectional", that is both remotely piloted aircraft and the ground station have substantially synchronised clocks, and the ground station communicates with the remotely piloted aircraft with timestamped messages, and the remotely piloted aircraft calculates the time difference of the received message timestamp and the time of receiving.

In an embodiment, the latency may be extended to key performance index (KPI) of the communications. Examples of the KPI of the communications may include, but are not limited to, one or more combination of bit error ratio (BER), signal strength, bandwidth, latency, number of available neighbour cells, their signal strength, and so forth.

In an embodiment, the remotely piloted aircraft is further configured to initiate an evasive action when no communication is received within a pre-defined period. The remotely piloted aircraft may be further configured to transmit an evasive signal when initiating the evasive action. For example, the remotely piloted aircraft initiates the evasive action when no communication is received within five minutes, thirty minutes, an hour, or so forth.

In an alternative embodiment, the remotely piloted aircraft is configured to execute an evasive action when a speed of the remotely piloted aircraft is below a suitable speed or a pre-defined threshold speed value for remotely piloted aircraft. Also, the remotely piloted aircraft may be configured to initiate an evasive action when no communication is received from the ground station(s) within a pre-defined period.

In an embodiment, the evasive action may include such as, but are not limited to: raising an altitude of the remotely piloted aircraft to gain a less occluded line of sight to ground station to improve communication; lowering the speed; selecting a new speed; selecting a new altitude for the remotely piloted aircraft flying; selecting an alternative course/direction to move towards an area with better communication's KPI or QoS; turning back based on an assumption that the previous route was having sufficient KPIs and reasonably they are assumed to remain same at this time too; selecting a different course or direction based on external information such as, but not limited to, cell coverage maps, prior measurements, and so forth; executing a lost link procedure, such as returning to a home location, doing a forced landing on ground, and so forth.

In an embodiment, the evasive action is subject to other constraints such as, but not limited to, geofencing (i.e. whether the remotely piloted aircraft is allowed to fly in a particular area or not), restrictions, flight plan (for example, corridor for flying), and so forth.

The clock of the remotely piloted aircraft may include satellite signal clocks. In some embodiments, the clock of the remotely piloted aircraft includes a microcontroller unit with real-time clock function. The clock of the remotely piloted aircraft may be configured to synchronise with a clock of the ground station. In an embodiment, the clock of the remotely piloted aircraft is configured to synchronise with the clock of the ground station based on messages or communication received from the ground station. Further, the clock includes software, hardware, firmware, or combination of these. Also, the clock of the remotely piloted aircraft is synchronised with the clock of the ground station during a flight start procedure. For example, the clock of the remotely piloted aircraft may be synchronised during initiation of the flight of the remotely piloted aircraft.

The at least one radio receiver and the at least one radio transmitter of the remotely piloted aircraft are configured to communicate with at least one radio transmitter of a ground station, via at least one radio communication network, which ground station is equipped with a clock.

In some embodiments, the at least one radio receiver of the remotely piloted aircraft can be a device including software, hardware, firmware, or combination of these. Further, the at least one radio receiver is configured to receive communication from the ground station(s) via one or more communication or radio communication networks. For example, the receiver of the remotely piloted aircraft can receive a command for controlling the speed of the remotely piloted aircraft during its flight from a ground station.

In some embodiments, the at least one radio transmitter of the remotely piloted aircraft can be a device including software, hardware, firmware, or a combination of these. Further, the at least one radio transmitter is configured to transmit messages or information to the ground station(s) via one or more communication or radio communication networks. For example, the at least one radio transmitter of the remotely piloted aircraft can send measurement data, location data, operational parameters/status of the remotely piloted aircraft, and so forth.

In an embodiment, while analysing the quality of the received communication, the remotely piloted aircraft or specifically the at least one radio receiver and/or the at least one radio transmitter is further configured to communicate with the ground station.

The controller of the remotely piloted aircraft is configured to control movements of the remotely piloted aircraft, using the flight parameters of the remotely piloted aircraft. In an embodiment, the controller includes a microcontroller unit for controlling the movements of the remotely piloted aircraft based on the flight parameters. For example, the controller may change the direction of flying or an altitude of the remotely piloted aircraft based on a command received from the ground station.

In a system according to the present disclosure, the remotely piloted aircraft further comprises a processor. The processor of the remotely piloted aircraft is in this case communicably coupled to the clock, the at least one radio receiver, at least one radio transmitter, and the controller. In an embodiment, the processor may be a single device or a combination of multiple devices. The processor of the remotely piloted aircraft is configured to analyse a communication, including calculating the latency of the communication, and instructing the controller to modify at least one flight parameter based on the calculated latency and pre-loaded instructions. For example, the processor is configured to analyse the communication(s) received from the ground station(s). The processor may be further configured to calculate the latency of the flight control command based on the timestamp of the communication, and to instruct the controller to modify at least one flight parameter based on the calculated latency and pre-loaded instructions. Also, the processor may be configured to analyse the quality (for example, bit rate, error rate, jitter, etc.) of the received communication and to instruct the controller to modify at least one flight parameter based on the analysed quality of the received communication.

In an embodiment, the remotely piloted aircraft further includes means for measuring radio communication quality, communicably coupled to the processor. The processor is, in this case, further configured to analyse the quality of the received communication and to instruct the controller to modify at least one flight parameter based on the analysed quality of the received communication.

The ground station includes a clock, at least one radio receiver, and at least one radio transmitter. The ground station may be configured to transmit to the remotely piloted aircraft a timestamped communication including at least one flight control command. The ground station may also include a processor configured to control the remotely piloted aircraft from the ground station based by sending commands. Further, the ground station may be configured to send commands and instructions to the remotely piloted aircraft via at least one communication link or a radio communication network.

In an embodiment, an operator, for example a human, at the ground station enters the commands at the ground station for controlling the remotely piloted aircraft or the remotely piloted aircraft.

In an embodiment, the clock of the remotely piloted aircraft and the clock of the ground station are satellite signal clocks. Thus, the clock of the ground station may include satellite signal clocks. In an alternative embodiment, the clock of the ground station includes a microcontroller unit with real-time clock function. Further, the clock of the ground station may be configured to synchronise with the clock of the remotely piloted aircraft. For example, the clock of the ground station may synchronise with the clock of the remotely piloted aircraft based on messages or communication received from the remotely piloted aircraft. In an embodiment, the clock includes software, hardware, firmware, or a combination of these.

In an embodiment, the communication originates from the ground station. Further, the communication originating from the ground station may include at least one flight control command such as, command for decreasing speed of the remotely piloted aircraft. In an embodiment, the ground station is configured to request prioritising the communication. For example, a ground station may request the remotely piloted aircraft to prioritise a particular communication message over other communication messages. Alternatively, a ground station may request the used communication network such as mobile networks including 2G, 3G, 4G, LTE or 5G networks to prioritize the traffic or messages between a ground station and a remotely piloted aircraft.

In an embodiment, the at least one radio receiver of the ground station can be software, hardware, firmware, or combination of these. The at least one radio receiver may be configured to receive communication from the remotely piloted aircraft(s) via one or more communication or radio communication networks. For example, the radio receiver of the ground station can receive measurement data, location data, operational parameters/status from the remotely piloted aircraft, and so forth.

In one embodiment, the at least one radio transmitter of the ground station can be a software, a hardware, a firmware, or combination of these. Further, the at least one radio transmitter may be configured to transmit messages or information to the remotely piloted aircraft(s) through one or more communication or radio communication networks. For example, the at least one radio transmitter of the ground station can transmit/send a command for controlling the speed of the remotely piloted aircraft during its flight.

The remotely piloted aircraft and the ground station may communicate with each other via a communication network or a radio communication network. Examples of the communication network (or radio communication network) may include, such as, but are not limited to, a point-to-point (p2p) radio network, cellular radio network and satellite radio network. For example, the remotely piloted aircraft and the ground station may communicate via for example, four mobile internet connections through different telecom or internet operators. In an embodiment, the ground station and the remotely piloted aircraft may communicate with each other via a hybrid communication network. For example, control commands may be sent via a point-to-point connection, and data is sent back through another communication network. In an embodiment, the communication network is a radio communication network.

In an exemplary scenario, the remotely piloted aircraft may have four different radio communication interfaces and four different networks, i.e., "A", "B", "C", and "D", for the communication. The remotely piloted aircraft may be configured to receive a timestamped communication from at least four communication interfaces of a ground station via the four networks. Further, the processor of the remotely piloted aircraft may analyse the received timestamped communications to calculate or determine communication latency, i.e. "$t_A$", "$t_B$", "$t_C$", and "$t_D$", over each of the four networks between the remotely piloted aircraft and the ground station. Moreover, the remotely piloted aircraft is configured to define a maximum speed for the remotely piloted aircraft based on a smallest latency value of the "$t_A$", "$t_B$", "$t_C$", and "$t_D$", for example, "$t_A$" being the smallest latency. For example, the maximum speed may be defined as:

$$"v_{max}=d/t_A"$$

where, "d" is a pre-determined "safe" distance describing the maximum distance the remotely piloted aircraft may fly without human control. For example, a radio link maximum distance is the theoretical or calculated maximum for point-to-point connections. However, in mobile internet there is technically no maximum distance, there is only "coverage". Further, the "maximum distance" is an estimate of coverage in the area. For example, when the coverage is worse than the estimate because of either latency being high or the bandwidth being low may instruct the remotely piloted aircraft that the remotely piloted aircraft should decrease its speed. Further, the remotely piloted aircraft's speed may be reduced and the remotely piloted aircraft may not return in case failure of one network connection of the multiple connections. In an embodiment, use of several mobile networks means certain links can be prioritised or otherwise are calculated by their importance. In an embodiment, when four network connections are used, then after losing three network connections, the remotely piloted aircraft may fly straight back via points where the remotely piloted aircraft knows there still was a valid and running network connection. For example, estimating that three of the four network connections may be gone after one kilometer, and then it may instruct the remotely piloted aircraft to turn back after five hundred meters before those network connections fail.

In an alternative embodiment, the distance can be set by the authorities associated with the ground station or by the government of a state or country. Further, the distance may vary depending on a remotely piloted aircraft type, an area of operation (such as, a populated area (city) versus desert), a time of the day, weather, amount of traffic (for example, other remotely piloted aircraft) in the area, and a communication type (for example, a point-to-point communication or a cellular communication). Moreover, the remotely piloted aircraft may set the maximum speed for the remotely piloted aircraft in the autopilot module to limit the speed. Further, the autopilot module is configured to change the speed of the remotely piloted aircraft based on one or more commands and/or by sensing one or more weather conditions.

In another exemplary scenario, the remotely piloted aircraft may slow down or decrease its speed based on a telemetry connection latency or reliability. For example, the remotely piloted aircraft may calculate the slowing down of the speed on average, separate or a speed different than that of the four different telemetry connections. For example, if connection reliability for two connections (or networks "A" and "D") becomes zero, or an average of connection reliability drops significantly, the speed is decreased. In another example, the speed is decreased when there is a drop in speed and the remotely piloted aircraft may follow certain rule according to the distance from starting point—such as when theoretical limit reached in radio control distance speed becomes zero or negative. In an alternative embodiment, when radio communication reliability drops, the speed of the remotely piloted aircraft may become less and less. Therefore, in such embodiments, the remotely piloted aircraft may never reach a point of being outside radio communication range. In an embodiment, when the speed drops to a certain limit, for example, five meter per second, then the remotely piloted aircraft may return to its previous location or the ground.

In an embodiment, the disclosed methods and systems for modifying flight parameters of a remotely piloted aircraft works on a point-to-point connection or a direct data link communication network.

In an exemplary scenario, if two links/communication interfaces/communication networks are used and others drops, then the remotely piloted aircraft may log a data link drop location and reduce speed. For example, the speed is reduced to half of the original/current speed. Further, if the other link/communication interface/communication network drops, the remotely piloted aircraft may return to a home location, for example, the ground, using the same path the remotely piloted aircraft used to come.

The present disclosure provides a method for modifying flight parameters of a remotely piloted aircraft. The remotely piloted aircraft can communicate with the ground station via the at least one radio receiver and at least one radio transmitter. The remotely piloted aircraft includes a controller for controlling movements of the remotely piloted aircraft using flight. The remotely piloted aircraft can receive communication from the ground station. The remotely piloted aircraft can also analyse the communication between the remotely piloted aircraft and the ground station, including calculating the latency of the communication. The method further includes modifying, by the remotely piloted aircraft, at least one flight parameter based on the calculated latency and pre-loaded instructions. In an embodiment, the clock of the remotely piloted aircraft is synchronised with the clock of the ground station. In another embodiment, an evasive action is initiated when no communication is received within a pre-defined period. In a yet further embodiment, the remotely piloted aircraft transmits an evasive signal when initiating the evasive action.

The present disclosure provides reliable communication links between the remotely piloted aircraft and the ground station(s). The present disclosure also enables assessing and altering flight parameters such as, but not limiting to, a speed, a direction, an altitude, and so forth of a remotely piloted aircraft, by providing reliable communication methods. The present disclosure provides methods and systems for altering/modifying essential flight parameters by utilising the measurable properties of the communication link between the remotely piloted aircraft and the ground station for avoiding such situation and performing reasonably if the communication link/network is lost or severely disturbed.

DETAILED DESCRIPTION OF THE DRAWINGS

Referring to FIG. 1, illustrated is a schematic illustration of a system 100 where various embodiments of the present invention can function. The system 100 includes a remotely piloted aircraft 102, a radio communication network 104, and a ground station 106. The remotely piloted aircraft 102 is configured to receive and send information and/or messages from and to the ground station 106. The ground station 106 can send a communication including at least one flight control command to the remotely piloted aircraft 102. The remotely piloted aircraft 102 is configured to analyse the received communication, including calculating the latency of the flight control command. The remotely piloted aircraft is also configured to modify at least one flight parameter based on the calculated latency and pre-loaded instructions.

Further, the remotely piloted aircraft 102 includes a clock 108, at least one radio receiver 110, at least one radio transmitter 112, a controller 114, and a processor 116. The controller 114 is configured to control movements of the remotely piloted aircraft using flight parameters. The processor 116 is communicably coupled to the clock 108, the at least one radio receiver 110, the at least one radio transmitter 112, and the controller 114.

The ground station 106 includes a clock 118, at least one least one radio receiver 120, and at least one radio transmitter 122. The at least one radio receiver 110 and the at least one radio transmitter 112 are configured to communicate with the at least one radio transmitter 122 of the ground station 106, via the at least one radio communication network 104. The processor 116 of the remotely piloted aircraft 102 is configured to analyse a communication, including calculating the latency of the communication, and to instruct the controller 114 to modify at least one flight parameter based on the calculated latency and pre-loaded instructions.

In an embodiment, an operator (not shown) is present at the ground station 106 and may enter flight control commands at the ground station 106 to control the movements of the remotely piloted aircraft 102. The operator may be a human operator or a machine with preloaded instructions that may utilise the ground station 106 to supervise the operation of the remotely piloted aircraft 102. The ground station 106 may, in turn, transmit the flight control commands entered by the operator to the remotely piloted aircraft 102. Though not shown, the ground station 106 may also be used to monitor the operation of one or more remotely piloted aircraft 102.

Figure 2:
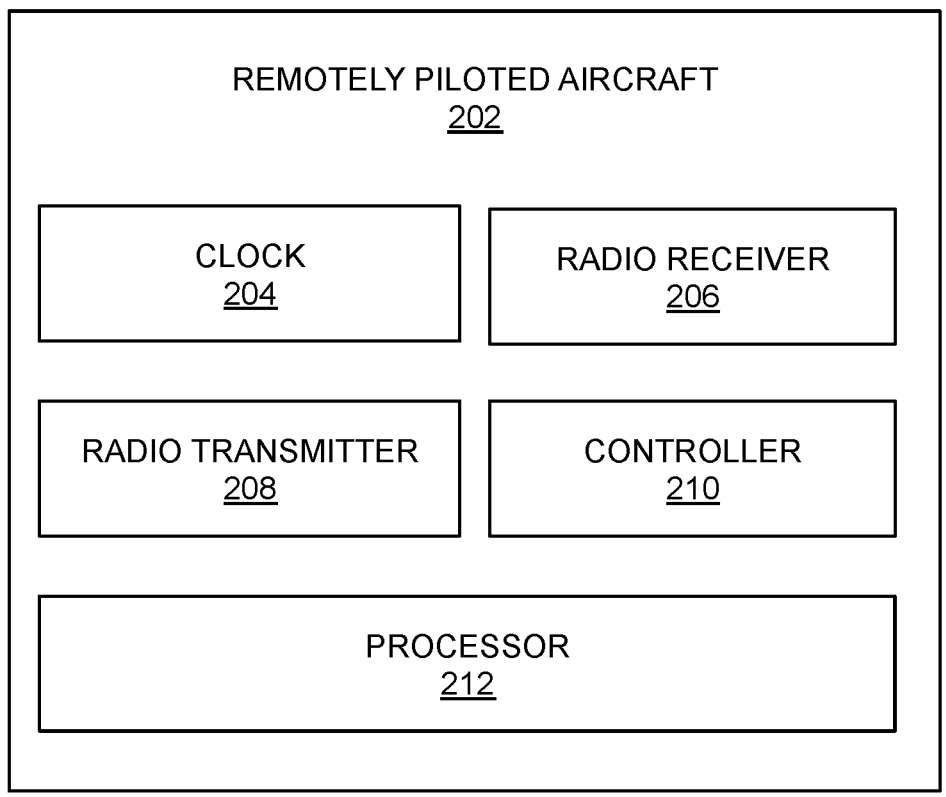
FIG. 2 is a block diagram illustrating system elements of a remotely piloted aircraft (RPA), in accordance with an embodiment of the present disclosure.

FIG. 2 is a block diagram 200 illustrating elements of a remotely piloted aircraft (RPA) 202, in accordance with an embodiment of the present disclosure. As shown, the RPA 202 primarily includes a clock 204, a radio receiver 206, a radio transmitter 208, a controller 210, and a processor 212. The clock of the RPA 202 can be synchronised with a clock of the ground station 106. The radio receiver 206 is configured to receive a communication including at least one flight control command from one or more ground stations 106. The radio transmitter 208 is configured to transmit a reply communication including information, such as, but not limiting to, measurement data, location data, operational parameters, the status of the RPA 202, and so forth to the ground station 106. The controller 210 is configured to control movements of the RPA 202 using flight parameters. The processor 212 is communicably coupled to the clock 204, the radio receiver 206, the radio transmitter 208, and the controller 210. Further, the processor 212 is configured to analyse a communication, including calculating the latency of the communication, and instruct the controller 210 to modify at least one flight parameter based on the calculated latency and pre-loaded instructions. The original communication may also be sent by the RPA 202, and acknowledged by the ground station 106.

Figure 3:
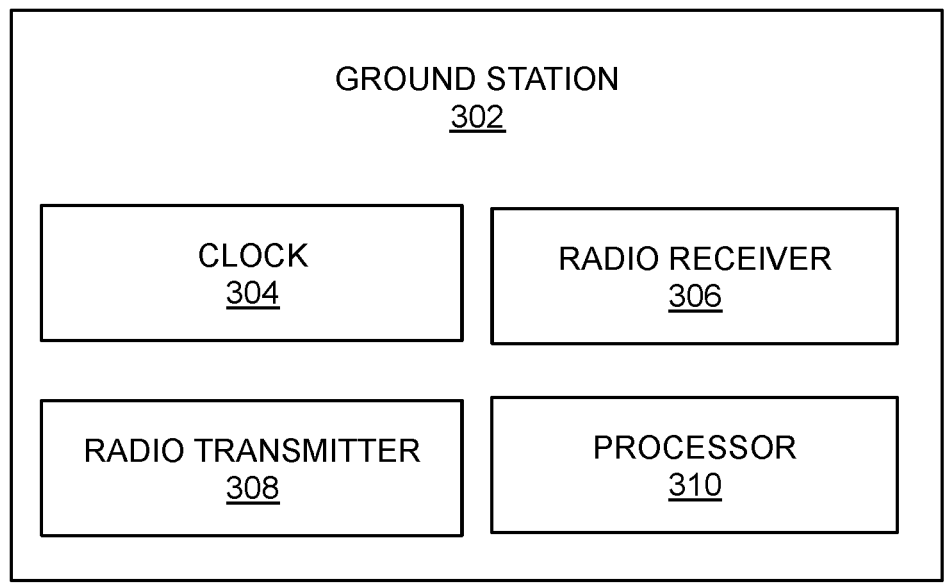
FIG. 3 is a block diagram illustrating system elements of a ground station, in accordance with an embodiment of the present disclosure.

FIG. 3 is a block diagram 300 illustrating elements of a ground station 302, in accordance with an embodiment of the present disclosure. As shown, the ground station 302 primarily includes a clock 304, a radio receiver 306, a radio transmitter 308, and a processor 310. The clock 304 is configured to insert a timestamp in a communication sent to other devices such as the RPA 202, as discussed with reference to FIG. 2. The clock can be a satellite signal clock configured to synchronise with a clock of the other aerial devices such as, that of the RPA 202. The radio transmitter 308 is configured to transmit the timestamped communications to the RPA 202. The radio transmitter 308 is also configured to send messages requesting prioritisation of the communication to the RPA 202. The radio receiver 306 is configured to receive a reply communication including for example, measurement data, location data, operational parameters, status information, and so forth from the RPA 202. The processor 310 is configured to process and analyse the received data/information.

Figure 4:
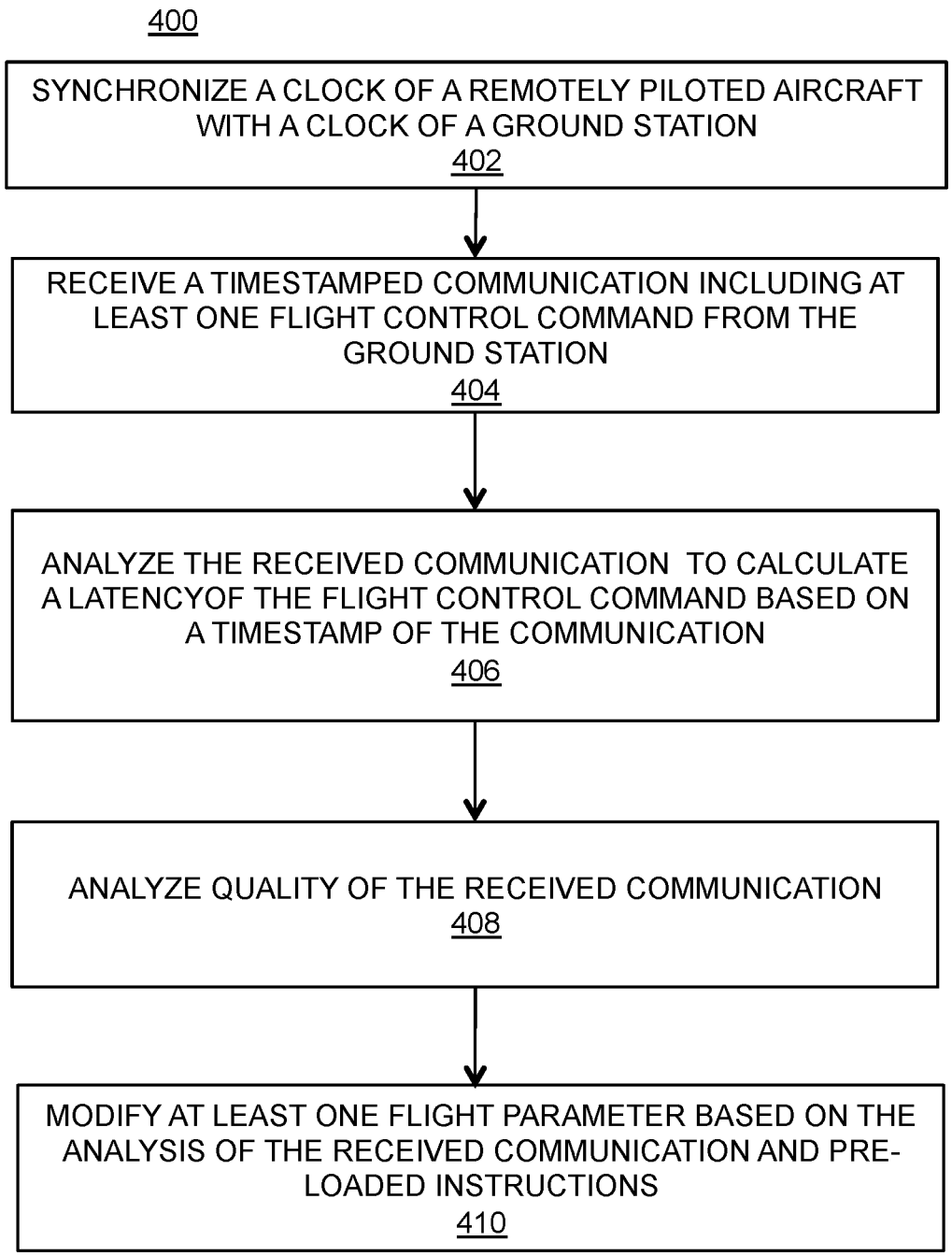
FIG. 4 is a flowchart illustrating a method for modifying a number of flight parameters of a remotely piloted aircraft, in accordance with an embodiment of the present disclosure.

FIG. 4 is a flowchart illustrating a method 400 for modifying flight parameters of a remotely piloted aircraft (RPA), in accordance with an embodiment of the present disclosure. At step 402, a clock of the RPA is synchronised with a clock of a ground station. At step 404, a timestamped communication including at least one flight control command is received from a ground station. At step 406, the received communication is analysed to calculate a latency of the flight control command based on a timestamp of the communication. Then at step 408, the quality of the received communication is analysed. After that, at step 410, at least one flight parameter is modified based on the analysis of the received communication and pre-loaded instructions.

FIG. 5 is a flowchart illustrating a method for modifying flight parameters of a remotely piloted aircraft, in accordance with an embodiment of the present disclosure. At step 502, a timestamped communication including at least one flight control command is received, by the remotely piloted aircraft, from a ground station. At step 504, the remotely piloted aircraft receives the request for prioritising the communication. At step 506, the remotely piloted aircraft communicates with the ground station for analysing the received communication. Then at step 508, the remotely piloted aircraft analyses the received communication to calculate a latency of the flight control command based on a timestamp of the received communication. At step 510, a quality of the received communication is analysed. Then at step 512, at least one flight parameter of the remotely piloted aircraft is modified based on the analysis of the received communication and pre-loaded instructions. Thereafter, at step 514, a reply communication is sent to the ground station from the remotely piloted aircraft. The reply communication can include measurement data, location data, operational parameters, status information, and so forth.

Figure 6:
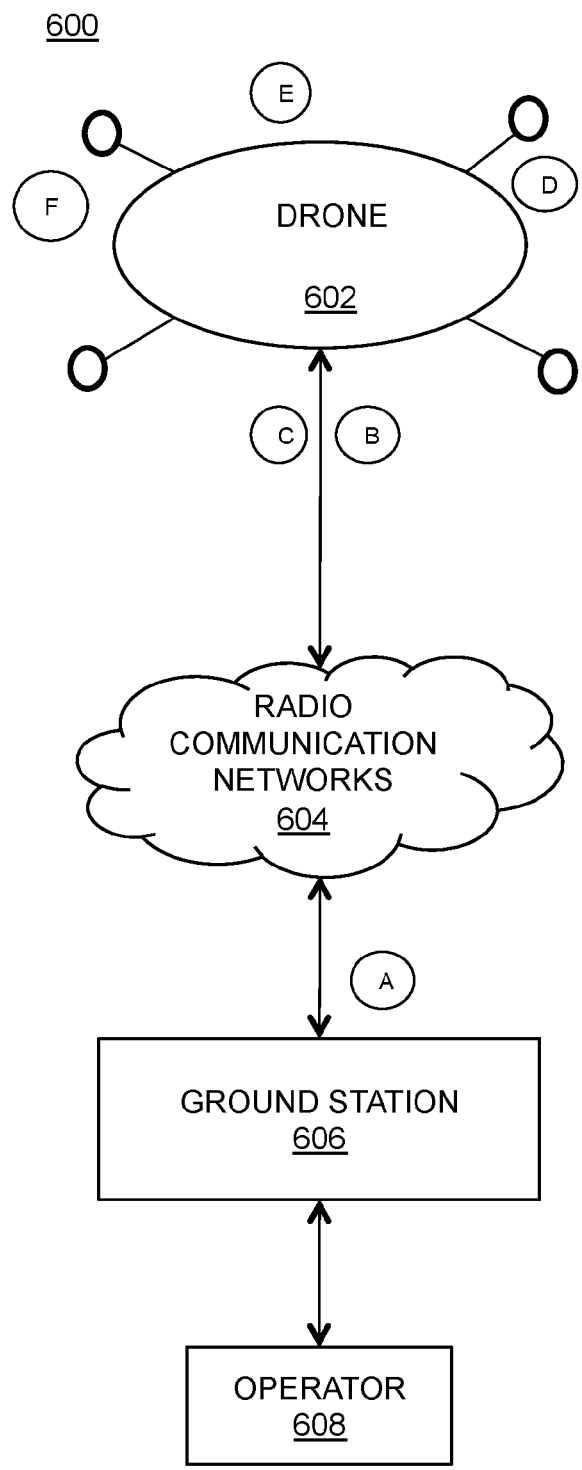
FIG. 6 is a schematic illustration of a use case showing a message flow while using a system for modifying a number of flight parameters of a remotely piloted aircraft, in accordance with an embodiment of the present disclosure.

FIG. 6 is a schematic illustration of a use case 600 showing a message flow while using a system for modifying some flight parameters of a remotely piloted aircraft 602, in accordance with an embodiment of the present disclosure. A ground station 606 sends a timestamped communication to the remotely piloted aircraft 602 over one or more communication network 604 at step "A". The remotely piloted aircraft 602 receives the communication via multiple communication networks 604 at step "B". The remotely piloted aircraft 602 measures communication latency over the multiple networks 604 as shown at step "C". The remotely piloted aircraft 602 at step "D" then defines a maximum speed for the remotely piloted aircraft 602 based on a smallest latency value by comparing the measured communication latencies of the multiple networks 604 with each other. The remotely piloted aircraft 602 at step "E" sets a maximum speed to a value of the defined maximum speed of the remotely piloted aircraft 602 to limit the speed of the remotely piloted aircraft 602. The remotely piloted aircraft 602 takes an evasive action when the speed of the remotely piloted aircraft 602 is below a predefined speed threshold value at step "F".

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for modifying flight parameters of a remotely piloted aircraft, wherein the remotely piloted aircraft comprises:
   a clock;
   at least one radio receiver and at least one radio transmitter for communicating with at least one radio transmitter of a ground station, via at least one radio communication network, which ground station is equipped with a clock; and
   a controller for controlling movements of the remotely piloted aircraft using flight parameters;
   the method comprising:
   the remotely piloted aircraft analysing a communication between the remotely piloted aircraft and the ground station, including calculating a latency of the communication; and
   the remotely piloted aircraft modifying at least one flight parameter based on the calculated latency and pre-loaded instructions, wherein the pre-loaded instructions comprise at least one threshold value of the latency and allowed flight parameters.

2. A method according to claim 1, wherein the allowed flight parameters comprise one or more of regulatory rules, spatial coordinates, environmental conditions and operational parameters of the remotely piloted aircraft.

3. A method according to claim 1, wherein the communication comprises a timestamp and the latency is calculated based on the timestamp.

4. A method according to claim 1, wherein the communication originates from the ground station.

5. A method according to claim 4, wherein the communication originating from the ground station comprises at least one flight control command.

6. The method according to claim 1, further comprising synchronising the clock of the remotely piloted aircraft with the clock of the ground station.

7. A method according to claim 6, wherein synchronising the clocks is carried out during flight start procedure.

8. A method according to claim 6, wherein the clock of the remotely piloted aircraft and the clock of the ground station are satellite signal clocks.

9. A method according to claim 1, wherein a latency of a flight control command comprises a transmission time of a communication from the ground station to the remotely piloted aircraft and an analysis time of the communication from the ground station to the remotely piloted aircraft by the remotely piloted aircraft.

10. A method according to claim 1, wherein the latency of the communication comprises a transmission time of a communication from the remotely piloted aircraft to the ground station, a processing time of the communication from the remotely piloted aircraft to the ground station by the ground station, a transmission time of a reply communication from the ground station to the remotely piloted aircraft, and an analysis time of the reply communication by the remotely piloted aircraft.

11. A method according to claim 1, wherein the remotely piloted aircraft is configured to measure a quality of the communication, and the method further comprises analysing the quality of the communication and modifying at least one flight parameter based on the analysed quality of the communication.

12. A method according to claim 11, wherein the analysis of the quality of the communication further comprises communicating with the ground station and a latency of a flight control command further comprises a communication time between the remotely piloted aircraft and the ground station.

13. A method according to claim 1, wherein a flight control command is selected from one or more of a flight direction and a flight speed.

14. A method according to claim 1, wherein the method further comprises the ground station requesting prioritising the communication.

15. A method according to claim 1, wherein the method further comprises the remotely piloted aircraft initiating an evasive action when no communication is received within a pre-defined period.

16. A method according to claim 15, wherein the remotely piloted aircraft further transmits an evasive signal when initiating the evasive action.

17. A system for modifying flight parameters of a remotely piloted aircraft, comprising:
a remotely piloted aircraft comprising:
a clock;
at least one radio receiver and at least one radio transmitter;
a controller for controlling movements of the remotely piloted aircraft using flight parameters; and
a processor communicably coupled to the clock, the at least one radio receiver, at least one radio transmitter and the controller;
a ground station comprising:
a clock; and
at least one radio receiver and at least one radio transmitter; and
at least one radio communication network;
wherein
the processor is configured to analyse a communication received by the at least one radio receiver, including calculating the latency of the received communication, and to instruct the controller to modify at least one flight parameter based on the calculated latency and pre-loaded instructions, wherein the pre-loaded instructions comprise at least one threshold value of the latency and allowed flight parameters.

18. A system according to claim 17, wherein the remotely piloted aircraft is configured to measure a quality of the received communication, and the processor is further configured to analyse the quality of the received communication and to instruct the controller to modify at least one flight parameter based on the analysed quality of the received communication.

19. A system according to claim 17, wherein the at least one radio communication network is one or more of a point-to-point radio network, a cellular radio network, and a satellite radio network.

20. A system according to claim 17, wherein the clock of the remotely piloted aircraft and the clock of the ground station are satellite signal clocks.

* * * * *